US012650337B2

(12) United States Patent
Koide

(10) Patent No.: US 12,650,337 B2
(45) Date of Patent: Jun. 9, 2026

(54) DETECTION DEVICE

(71) Applicant: Magnolia White Corporation, Tokyo (JP)

(72) Inventor: Gen Koide, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 146 days.

(21) Appl. No.: 18/791,685

(22) Filed: Aug. 1, 2024

(65) Prior Publication Data

US 2024/0393173 A1 Nov. 28, 2024

Related U.S. Application Data

(63) Continuation of application No. PCT/JP2023/002953, filed on Jan. 31, 2023.

(30) Foreign Application Priority Data

Feb. 9, 2022 (JP) ................................. 2022-018801

(51) Int. Cl.
| | |
|---|---|
| *G01J 1/44* | (2006.01) |
| *G06V 40/13* | (2022.01) |
| *G06V 40/145* | (2022.01) |

(52) U.S. Cl.
CPC ............ *G01J 1/44* (2013.01); *G06V 40/1318* (2022.01); *G06V 40/145* (2022.01); *G01J 2001/446* (2013.01)

(58) Field of Classification Search
CPC .. G01J 1/44; G01J 2001/446; G06V 40/1318; G06V 40/145; H04N 25/76; H10F 30/20; H10F 39/12; H10K 39/32
See application file for complete search history.

(56) References Cited

U.S. PATENT DOCUMENTS

| | | |
|---|---|---|
| 2005/0023475 A1 | 2/2005 | Li et al. |
| 2007/0280409 A1 | 12/2007 | Konno |

(Continued)

FOREIGN PATENT DOCUMENTS

| | | |
|---|---|---|
| JP | 2005-057281 A | 3/2005 |
| JP | 2007-319199 A | 12/2007 |

(Continued)

OTHER PUBLICATIONS

Search Report issued in related International Patent Application No. PCT/JP2023/002953 mailed on Apr. 25, 2023 and English translation of same. 5 pages.

(Continued)

*Primary Examiner* — Tony Ko
(74) *Attorney, Agent, or Firm* — K&L Gates LLP

(57) ABSTRACT

According to an aspect, a detection device includes: a substrate; and a plurality of photodiodes provided in a detection area of the substrate. The photodiodes includes: a plurality of first electrodes provided correspondingly to the photodiodes; a second electrode provided across the photodiodes; and an organic photodiode layer that includes a first carrier transport layer, an active layer, and a second carrier transport layer, and is provided across the photodiodes. In the detection area, the first electrodes, the first carrier transport layer, the active layer, the second carrier transport layer, and the second electrode are stacked in the order as listed. Outside the detection area, a third electrode configured to be supplied with a reference potential is disposed between the second electrode provided so as to cover a side surface of the organic photodiode layer and the first electrodes arranged at an outermost periphery.

10 Claims, 11 Drawing Sheets

(56)     References Cited

U.S. PATENT DOCUMENTS

| | | | |
|---|---|---|---|
| 2009/0027358 A1 | 1/2009 | Hosono | |
| 2013/0228694 A1 | 9/2013 | Nakatsugawa et al. | |
| 2019/0214427 A1 | 7/2019 | Nozawa et al. | |
| 2021/0384453 A1 | 12/2021 | Kawata | |
| 2023/0054533 A1* | 2/2023 | Himoto | .................. H10K 39/38 |
| 2023/0301124 A1* | 9/2023 | Asozu | ................... H10K 39/32 |
| | | | 257/40 |

FOREIGN PATENT DOCUMENTS

| | | | |
|---|---|---|---|
| JP | 2009-032005 A | 2/2009 |
| JP | 2019-121804 A | 7/2019 |
| WO | WO2012/056949 A1 | 5/2012 |
| WO | WO2020/188959 A1 | 9/2020 |

OTHER PUBLICATIONS

Office Action issued in related Japanese Patent Application No. 2023-580180 on Jul. 1, 2025 and English translation of same. 8 pages.

\* cited by examiner

DETECTION DEVICE

CROSS-REFERENCE TO RELATED APPLICATION

This application claims the benefit of priority from Japanese Patent Application No. 2022-018801 filed on Feb. 9, 2022 and International Patent Application No. PCT/JP2023/002953 filed on Jan. 31, 2023, the entire contents of which are incorporated herein by reference.

BACKGROUND

1. Technical Field

What is disclosed herein relates to a detection device.

2. Description of the Related Art

Optical sensors capable of detecting fingerprint patterns and vein or vascular patterns are known (refer to, for example, Japanese Patent Application Laid-open Publication No. 2009-032005). Such optical sensors each include a plurality of photodiodes each using an organic semiconductor material as an active layer. As described in WO 2020/188959, each of the photodiodes is located between a lower electrode and an upper electrode and is formed such that, for example, the lower electrode, an electron transport layer, the active layer, a hole transport layer, and the upper electrode are stacked in this order. The electron transport layer and the hole transport layer are also called buffer layers.

The upper electrode is coupled to wiring in a frame area around a detection area. The upper electrode is stacked on side surfaces of the active layer and the buffer layers in the frame area, and a leak current may flow between the upper electrode and the lower electrode at the outermost periphery.

For the foregoing reasons, there is a need for a detection device capable of reducing occurrences of short circuits between a second electrode and a first electrode at the outermost periphery.

SUMMARY

According to an aspect, a detection device includes: a substrate; and a plurality of photodiodes provided in a detection area of the substrate. The photodiodes includes: a plurality of first electrodes provided correspondingly to the photodiodes; a second electrode provided across the photodiodes; and an organic photodiode layer that includes a first carrier transport layer, an active layer, and a second carrier transport layer, and is provided across the photodiodes. In the detection area, the first electrodes, the first carrier transport layer, the active layer, the second carrier transport layer, and the second electrode are stacked in the order as listed. Outside the detection area, a third electrode configured to be supplied with a reference potential is disposed between the second electrode provided so as to cover a side surface of the organic photodiode layer and the first electrodes arranged at an outermost periphery.

DETAILED DESCRIPTION

Figure 1:
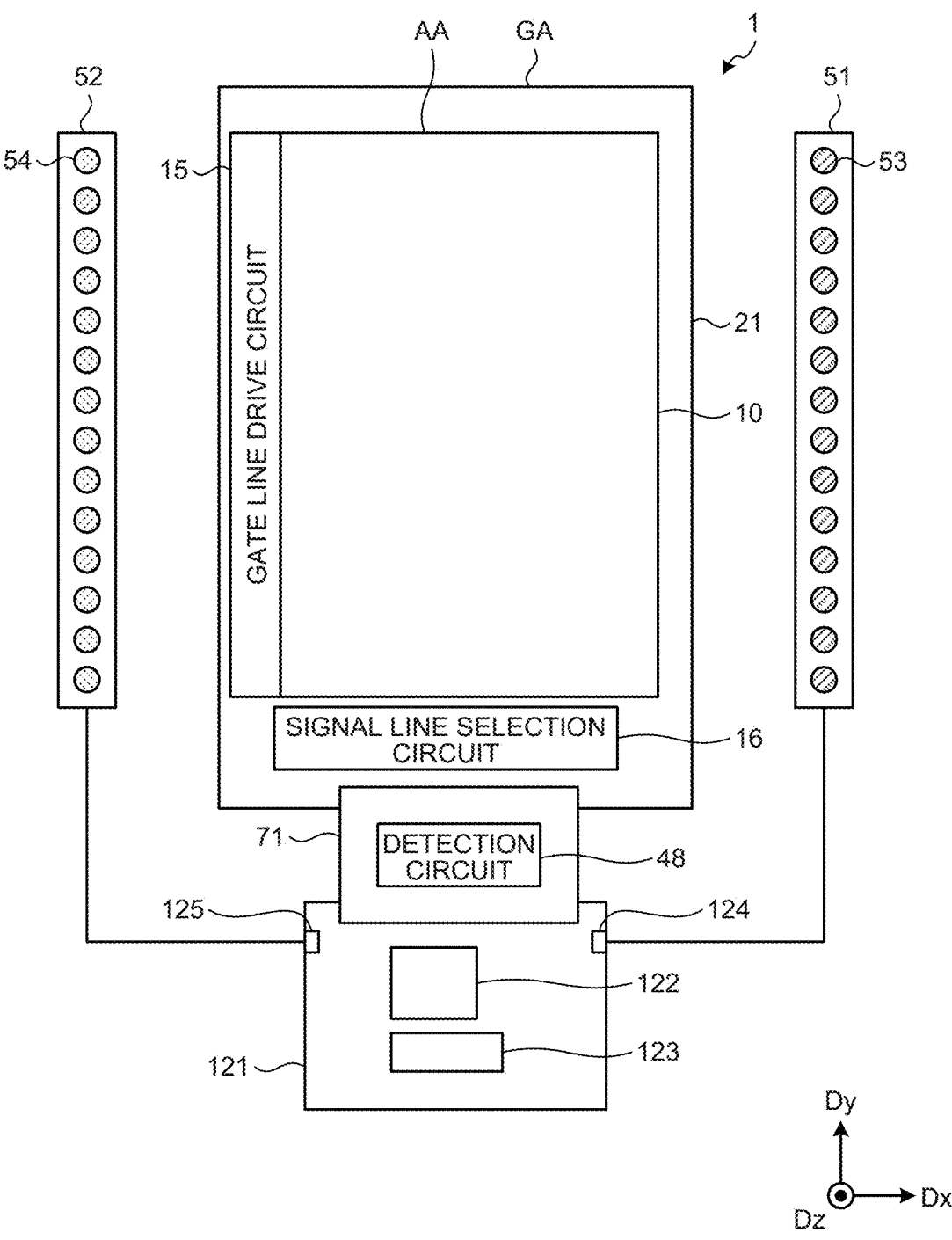
FIG. 1 is a schematic view illustrating a detection device according to a first embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the embodiments and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

FIG. 1 is a schematic view illustrating a detection device according to a first embodiment of the present disclosure. As illustrated in FIG. 1, a detection device 1 includes a substrate 21, a sensor 10, a gate line drive circuit 15, a signal line selection circuit 16, a detection circuit 48, a control circuit 122, a power supply circuit 123, a first light source base member 51, a second light source base member 52, a first light source 53, and a second light source 54. The first light source base member 51 is provided with a plurality of the first light sources 53. The second light source base member 52 is provided with a plurality of the second light sources 54.

The substrate 21 is electrically coupled to a control substrate 121 through a flexible printed circuit board 71. The flexible printed circuit board 71 is, for example, a flexible printed circuit board or a rigid circuit board. The flexible printed circuit board 71 is provided with the detection circuit 48. The control substrate 121 is provided with the control circuit 122 and the power supply circuit 123. The control circuit 122 is a field-programmable gate array (FPGA), for example. The control circuit 122 supplies control signals to the sensor 10, the gate line drive circuit 15, and the signal line selection circuit 16 to control detection operations of the sensor 10. The control circuit 122 also supplies control signals to the first and the second light sources 53 and 54 to control lighting and non-lighting of the first and the second light sources 53 and 54. The power supply circuit 123 supplies voltage signals including, for example, a sensor power supply signal (sensor power supply voltage) VDDSNS (refer to FIG. 4) to the sensor 10, the gate line drive circuit 15, and the signal line selection circuit 16.

The power supply circuit 123 supplies a power supply voltage to the first and the second light sources 53 and 54.

The substrate 21 has a detection area AA and a peripheral area GA. The detection area AA is an area provided with a plurality of photodiodes PD (refer to FIG. 4) included in the sensor 10. The peripheral area GA is an area between the outer perimeter of the detection area AA and the outer edges of the substrate 21 and is an area not provided with the photodiodes PD.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the sensor 10 and the detection circuit 48.

In the following description, the first direction Dx is one direction in a plane parallel to the substrate 21. The second direction Dy is one direction in the plane parallel to the substrate 21, and is a direction orthogonal to the first direction Dx. The second direction Dy may, however, non-orthogonally intersect the first direction Dx. The term "plan view" refers to a positional relation when viewed in a direction orthogonal to the substrate 21.

The first light sources 53 are provided on the first light source base member 51, and arranged along the second direction Dy. The second light sources 54 are provided on the second light source base member 52, and arranged along the second direction Dy. The first light source base member 51 and the second light source base member 52 are electrically coupled, through respective terminals 124 and 125, provided on the control substrate 121, to the control circuit 122 and the power supply circuit 123.

For example, inorganic light-emitting diodes (LEDs) or organic electroluminescent (EL) diodes (organic light-emitting diodes (OLEDs)) are used as the first and the second light sources 53 and 54. The first and the second light sources 53 and 54 emit first and second light, respectively, having different wavelengths.

The first light emitted from the first light sources 53 is mainly reflected on a surface of an object to be detected, such as a finger, and enters the sensor 10. As a result, the sensor 10 can detect a fingerprint by detecting a shape of asperities on the surface of the finger or the like. The second light emitted from the second light sources 54 is mainly reflected in the finger or the like, or transmitted through the finger or the like, and enters the sensor 10. As a result, the sensor 10 can detect information on a living body in the finger or the like. Examples of the information on the living body include pulse waves, pulsation, and a vascular image of the finger or a palm. That is, the detection device 1 may be configured as a fingerprint detection device to detect a fingerprint or a vein detection device to detect a vascular pattern of, for example, veins.

The first light may have a wavelength of from 500 nm to 600 nm, for example, a wavelength of approximately 550 nm, and the second light may have a wavelength of from 780 nm and 950 nm, for example, a wavelength of approximately 850 nm. In this case, the first light is blue or green visible light, and the second light is infrared light. The sensor 10 can detect the fingerprint based on the first light emitted from the first light sources 53. The second light emitted from the second light sources 54 is reflected in the object to be detected, such as the finger, or transmitted through or absorbed by the finger or the like, and enters the sensor 10. As a result, the sensor 10 can detect the pulse waves or the vascular image (vascular pattern) as the information on the living body in the finger or the like.

Alternatively, the first light may have a wavelength of from 600 nm to 700 nm, for example, approximately 660 nm, and the second light may have a wavelength of from 780 nm and 900 nm, for example, approximately 850 nm. In this case, the sensor 10 can detect a blood oxygen saturation level in addition to the pulse waves, the pulsation, and the vascular image as the information on the living body based on the first light emitted from the first light sources 53 and the second light emitted from the second light sources 54. Thus, the detection device 1 includes the first and the second light sources 53 and 54, and therefore, can detect the various information on the living body by performing the detection based on the first light and the detection based on the second light.

The arrangement of the first and the second light sources 53 and 54 illustrated in FIG. 1 is merely an example, and can be changed as appropriate. The detection device 1 is provided with a plurality of types of light sources (first and second light sources 53 and 54) as the light sources. However, the light sources are not limited thereto, and may be of one type. For example, the first and the second light sources 53 and 54 may be arranged on each of the first and the second base members 51 and 52. The first and the second light sources 53 and 54 may be provided on one light source base member, or three or more light source base members. Alternatively, only at least one light source needs to be disposed.

Figure 2:
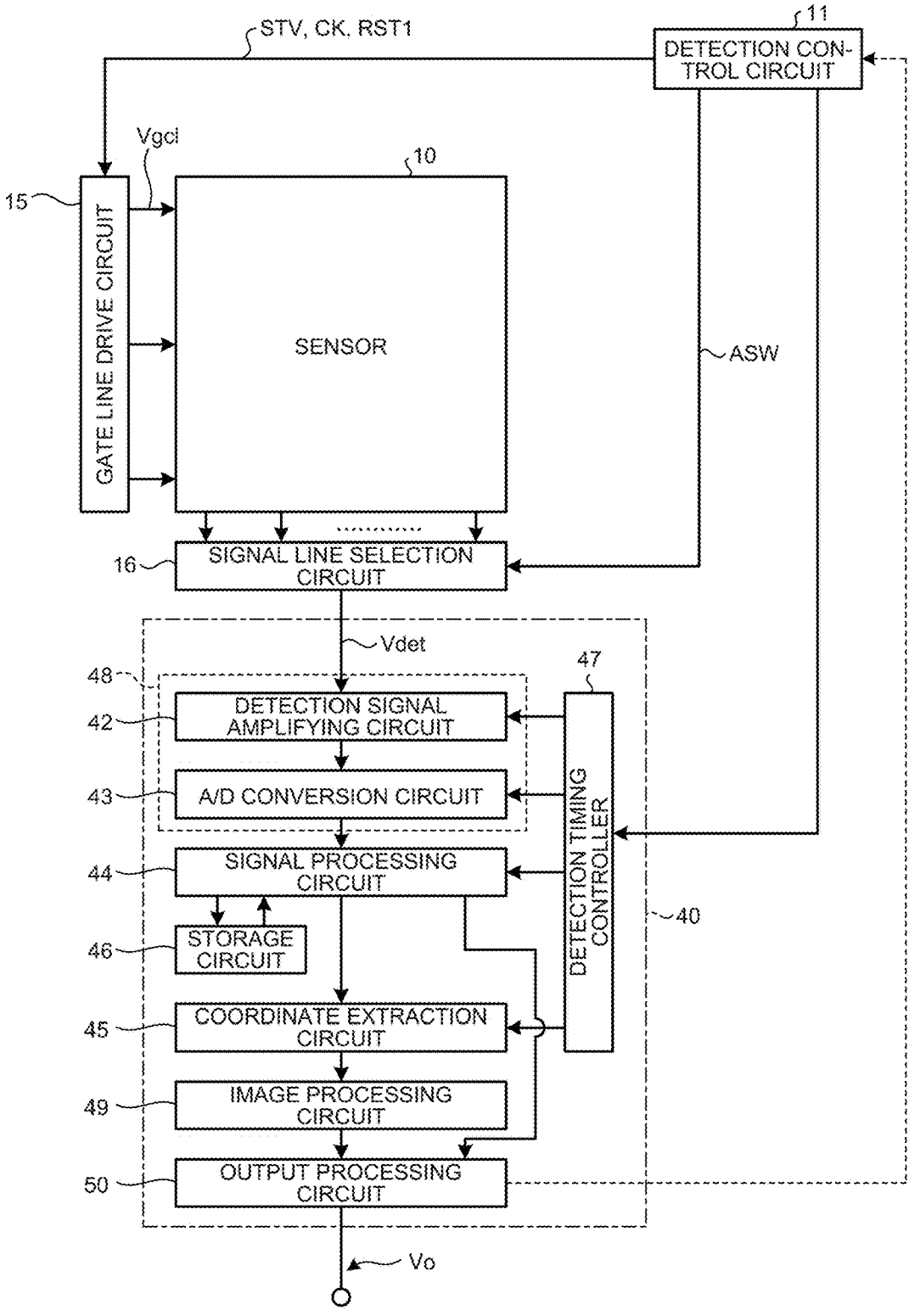
FIG. 2 is a block diagram illustrating a configuration example of the detection device according to the first embodiment.

FIG. 2 is a block diagram illustrating a configuration example of the detection device according to the first embodiment. As illustrated in FIG. 2, the detection device 1 further includes a detection controller (detection control circuit) 11 and a detector (detection processing circuit) 40. The control circuit 122 includes one, some, or all functions of the detection controller 11. The control circuit 122 also includes one, some, or all functions of the detector 40 other than those of the detection circuit 48.

The sensor 10 includes the photodiodes PD. Each of the photodiodes PD included in the sensor 10 outputs an electrical signal corresponding to light irradiating the photodiode PD as a detection signal Vdet to the signal line selection circuit 16. The sensor 10 performs the detection in response to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 also supplies various control signals to the first and the second light sources 53 and 54 to control the lighting and non-lighting of the respective first and second light sources 53 and 54.

The gate line drive circuit 15 is a circuit that drives a plurality of gate lines GCL (refer to FIG. 3) based on the various control signals. The gate line drive circuit 15 sequentially or simultaneously selects the gate lines GCL, and supplies the gate drive signals Vgcl to the selected gate lines GCL. By this operation, the gate line drive circuit 15 selects the photodiodes PD coupled to the gate lines GCL.

Figure 3:
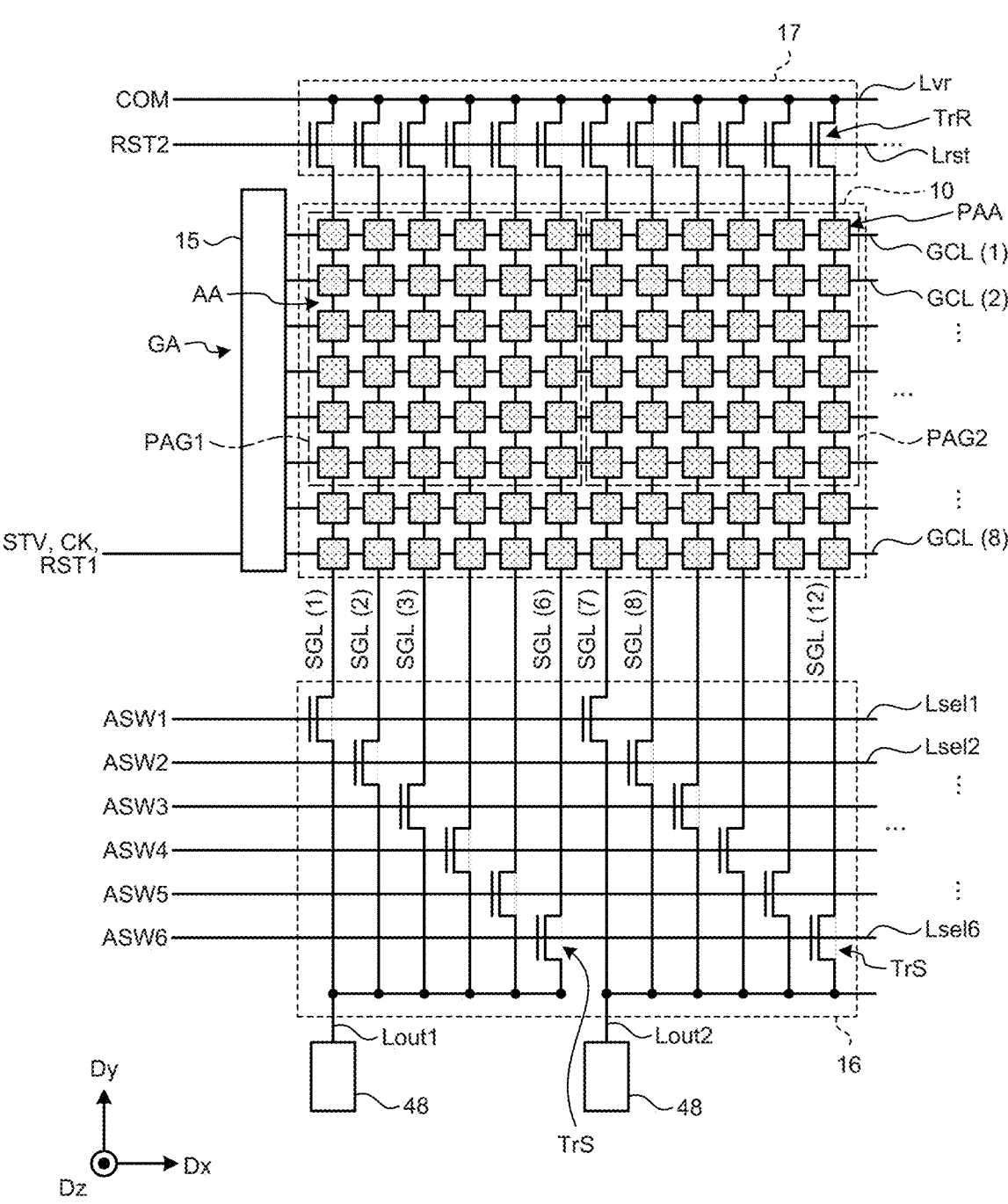
FIG. 3 is a circuit diagram illustrating the detection device.

The signal line selection circuit 16 is a switch circuit that sequentially or simultaneously selects a plurality of signal lines SGL (refer to FIG. 3). The signal line selection circuit 16 is a multiplexer, for example. The signal line selection circuit 16 couples the selected signal lines SGL to the detection circuit 48 based on the selection signal ASW supplied from the detection controller 11. By this operation, the signal line selection circuit 16 outputs the detection signals Vdet of the photodiodes PD to the detector 40.

The detector 40 includes the detection circuit 48, a signal processing circuit 44, a coordinate extraction circuit 45, a storage circuit 46, a detection timing control circuit (detection timing controller) 47, an image processing circuit 49, and an output processor (output processing circuit) 50. The detection timing control circuit 47 controls the detection circuit 48, the signal processing circuit 44, the coordinate extraction circuit 45, and the image processing circuit 49 so as to operate in synchronization with one another based on a control signal supplied from the detection controller 11.

The detection circuit 48 is an analog front-end (AFE) circuit, for example. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts analog signals output from the detection signal amplifying circuit 42 into digital signals.

The signal processing circuit 44 is a logic circuit that detects predetermined physical quantities received by the sensor 10 based on the output signals of the detection circuit 48. The signal processing circuit 44 can detect the asperities on the surface of the finger or the palm based on the signals from the detection circuit 48 when the finger is in contact with or in proximity to a detection surface. The signal processing circuit 44 can detect the information on the living body based on the signals from the detection circuit 48. Examples of the information on the living body include the vascular image, the pulse waves, the pulsation, and a blood oxygen level of the finger or the palm.

The signal processing circuit 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by noise or relative positional misalignment between the object to be detected, such as the finger, and the sensor 10.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger or the like when the contact or proximity of the finger is detected by the signal processing circuit 44. The coordinate extraction circuit 45 is the logic circuit that also obtains detected coordinates of blood vessels in the finger or the palm. The image processing circuit 49 combines the detection signals Vdet output from the respective photodiodes PD of the sensor 10 to generate two-dimensional information indicating the shape of the asperities on the surface of the finger or the like and two-dimensional information indicating the shape of the blood vessels in the finger or the palm. The coordinate extraction circuit 45 may output the detection signals Vdet as sensor output voltages Vo instead of calculating the detected coordinates. A case may be considered where the detector 40 does not include the coordinate extraction circuit 45 and the image processing circuit 49.

The output processor 50 serves as a processor that performs processing based on the outputs from the photodiodes PD. The output processor 50 may include, for example, the detected coordinates obtained by the coordinate extraction circuit 45 and the two-dimensional information generated by the image processing circuit 49 in the sensor output voltages Vo. The functions of the output processor 50 may be integrated into another component (for example, the image processing circuit 49).

The following describes a circuit configuration example of the detection device 1. FIG. 3 is a circuit diagram illustrating the detection device. As illustrated in FIG. 3, the sensor 10 includes a plurality of detection elements PAA arranged in a matrix having a row-column configuration. Each of the detection elements PAA is provided with the photodiode PD.

The gate lines GCL extend in the first direction Dx and are each coupled to the detection elements PAA arranged in the first direction Dx. A plurality of gate lines GCL (1), GCL (2), ..., GCL (8) are arranged in the second direction Dy, and are each coupled to the gate line drive circuit 15. In the following description, the gate lines GCL (1), GCL (2), ... , GCL (8) will each be simply referred to as the gate line GCL when they need not be distinguished from one another. To facilitate understanding of the description, FIG. 3 illustrates eight gate lines GCL. However, this is merely an example, and M gate lines GCL may be arranged (where M is 8 or larger, and is, for example, 256).

The signal lines SGL extend in the second direction Dy and are each coupled to the photodiodes PD of the detection elements PAA arranged in the second direction Dy. A plurality of signal lines SGL (1), SGL (2), ..., SGL (12) are arranged in the first direction Dx, and are each coupled to the signal line selection circuit 16 and a reset circuit 17. In the following description, the signal lines SGL (1), SGL (2), .. ., SGL (12) will each be simply referred to as the signal line SGL when they need not be distinguished from one another.

To facilitate understanding of the description, 12 signal lines SGL are illustrated. However, this is merely an example, and N signal lines SGL may be arranged (where N is 12 or larger, and is, for example, 252). The resolution of the sensor is, for example, 508 dots per inch (dpi), and the number of cells is 252×256. In FIG. 3, the sensor 10 is provided between the signal line selection circuit 16 and the reset circuit 17. The present disclosure is not limited thereto. The signal line selection circuit 16 and the reset circuit 17 may be coupled to ends of the signal lines SGL in the same direction.

The gate line drive circuit 15 receives various control signals including, for example, the start signal STV, the clock signal CK, and the reset signal RST1 from the control circuit 122 (refer to FIG. 1). The gate line drive circuit 15 sequentially selects the gate lines GCL (1), GCL (2), . . . , GCL (8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the detection elements PAA arranged in the first direction Dx are selected as detection targets.

The signal line selection circuit 16 includes a plurality of selection signal lines Lsel, a plurality of output signal lines Lout, and third switching elements TrS. The third switching elements TrS are provided correspondingly to the signal lines SGL. Six signal lines SGL (1), SGL (2), . . . , SGL (6) are coupled to a common output signal line Lout1. Six signal lines SGL (7), SGL (8), . . . , SGL (12) are coupled to a common output signal line Lout2. The output signal lines Lout1 and Lout2 are each coupled to the detection circuit 48.

The signal lines SGL (1), SGL (2), . . . , SGL (6) are grouped into a first signal line block, and the signal lines SGL (7), SGL (8), . . . , SGL (12) are grouped into a second signal line block. The selection signal lines Lsel are coupled to the gates of the respective third switching elements Trs included in one of the signal line blocks. One of the selection signal lines Lsel is coupled to the gates of the third switching elements TrS in the signal line blocks.

The control circuit 122 (refer to FIG. 1) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. The above-described configuration can reduce the number of integrated circuits (ICs) including the detection circuit 48 or the number of terminals of the ICs in the detection device 1. The signal line selection circuit 16 may couple more than one of the signal lines SGL collectively to the detection circuit 48.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the detection elements PAA.

Figure 4:
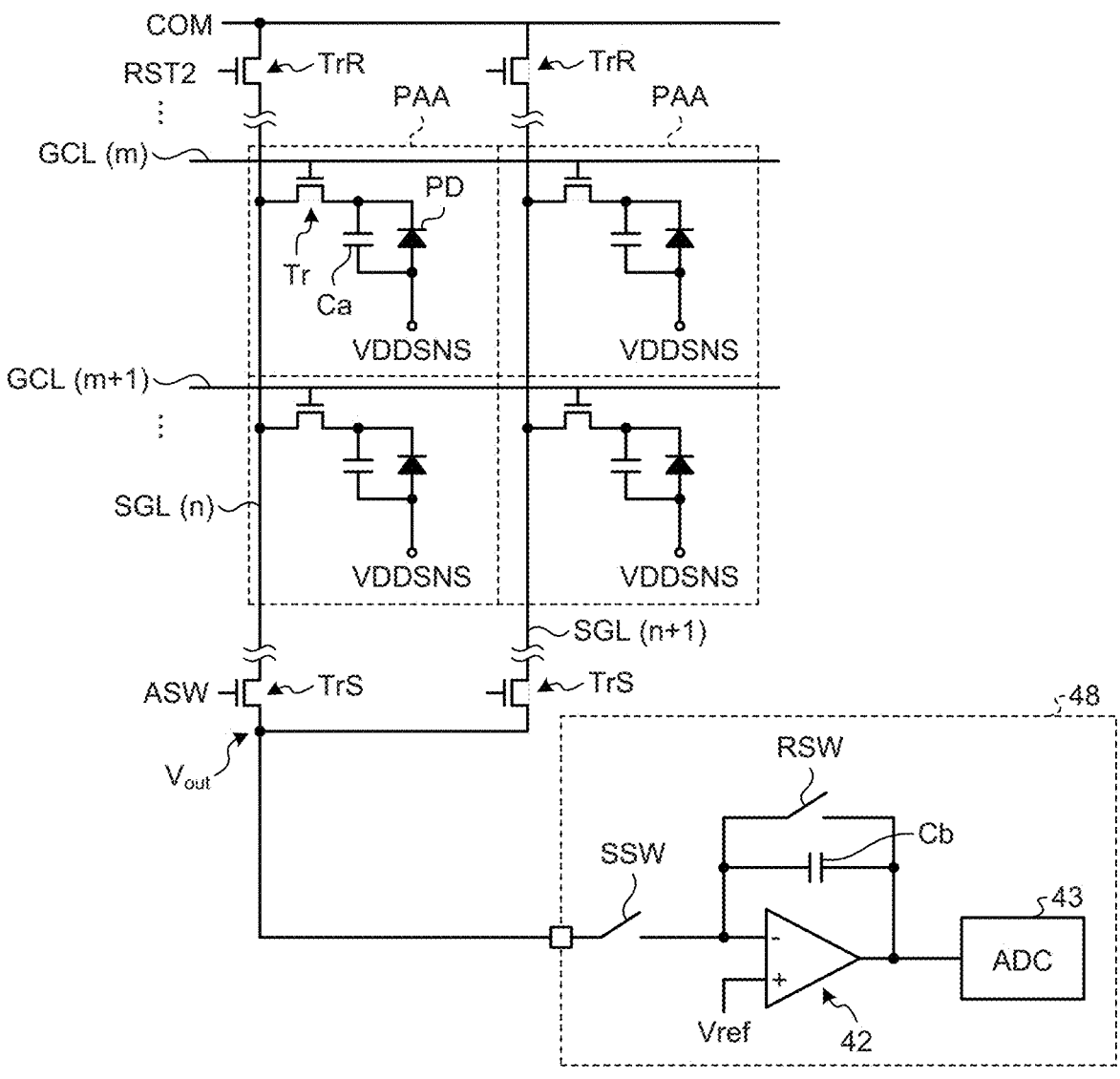
FIG. 4 is a circuit diagram illustrating a plurality of detection elements.

FIG. 4 is a circuit diagram illustrating the detection elements. FIG. 4 also illustrates a circuit configuration of the detection circuit 48. As illustrated in FIG. 4, the detection element PAA includes the photodiode PD, the capacitive element Ca, and a corresponding one of the first switching elements Tr. The capacitive element Ca is capacitance (sensor capacitance) generated in the photodiode PD and is equivalently coupled in parallel to the photodiode PD.

FIG. 4 illustrates two gate lines GCL (m) and GCL (m+1) arranged in the second direction Dy among the gate lines GCL. FIG. 4 also illustrates two signal lines SGL (n) and SGL (n+1) arranged in the first direction Dx among the signal lines SGL. The detection element PAA is an area surrounded by the gate lines GCL and the signal lines SGL.

The first switching elements Tr are provided correspondingly to the photodiodes PD. The first switching element Tr is configured as a thin-film transistor, and in this example, configured as an n-channel metal oxide semiconductor (MOS) thin-film transistor (TFT).

The gates of the first switching elements Tr belonging to the detection elements PAA arranged in the first direction Dx are coupled to the gate line GCL. The sources of the first switching elements Tr belonging to the detection elements PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM serving as an initial potential of the signal line SGL and the capacitive element Ca from the power supply circuit 123.

When the detection element PAA is irradiated with light, a current corresponding to the amount of the light flows through the photodiode PD. As a result, an electric charge is stored in the capacitive element Ca. When the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 1 can detect a signal corresponding to the amount of the light received by the photodiode PD for each of the detection elements PAA or for each block unit PAG.

During a read period, a switch SSW is turned on to couple the detection circuit 48 to the signal lines SGL. The detection signal amplifying circuit 42 of the detection circuit 48 converts a current supplied from the signal line SGL into a voltage corresponding to the value of the current, and amplifies the result. A reference potential (Vref) having a fixed potential is supplied to a non-inverting input terminal (+) of the detection signal amplifying circuit 42, and the signal lines SGL are coupled to an inverting input terminal (−) of the detection signal amplifying circuit 42. In the embodiment, the same signal as the reference signal COM is supplied as the reference potential (Vref) voltage. The signal processing circuit 44 (refer to FIG. 2) calculates the difference between the detection signal Vdet when the photodiode PD is irradiated by light and the detection signal Vdet when the photodiode PD is not irradiated by light, as each of the sensor output voltages Vo. The detection signal amplifying circuit 42 includes a capacitive element Cb and a reset switch RSW. During a reset period, the reset switch RSW is turned on to reset the electric charge of the capacitive element Cb.

Figure 5:
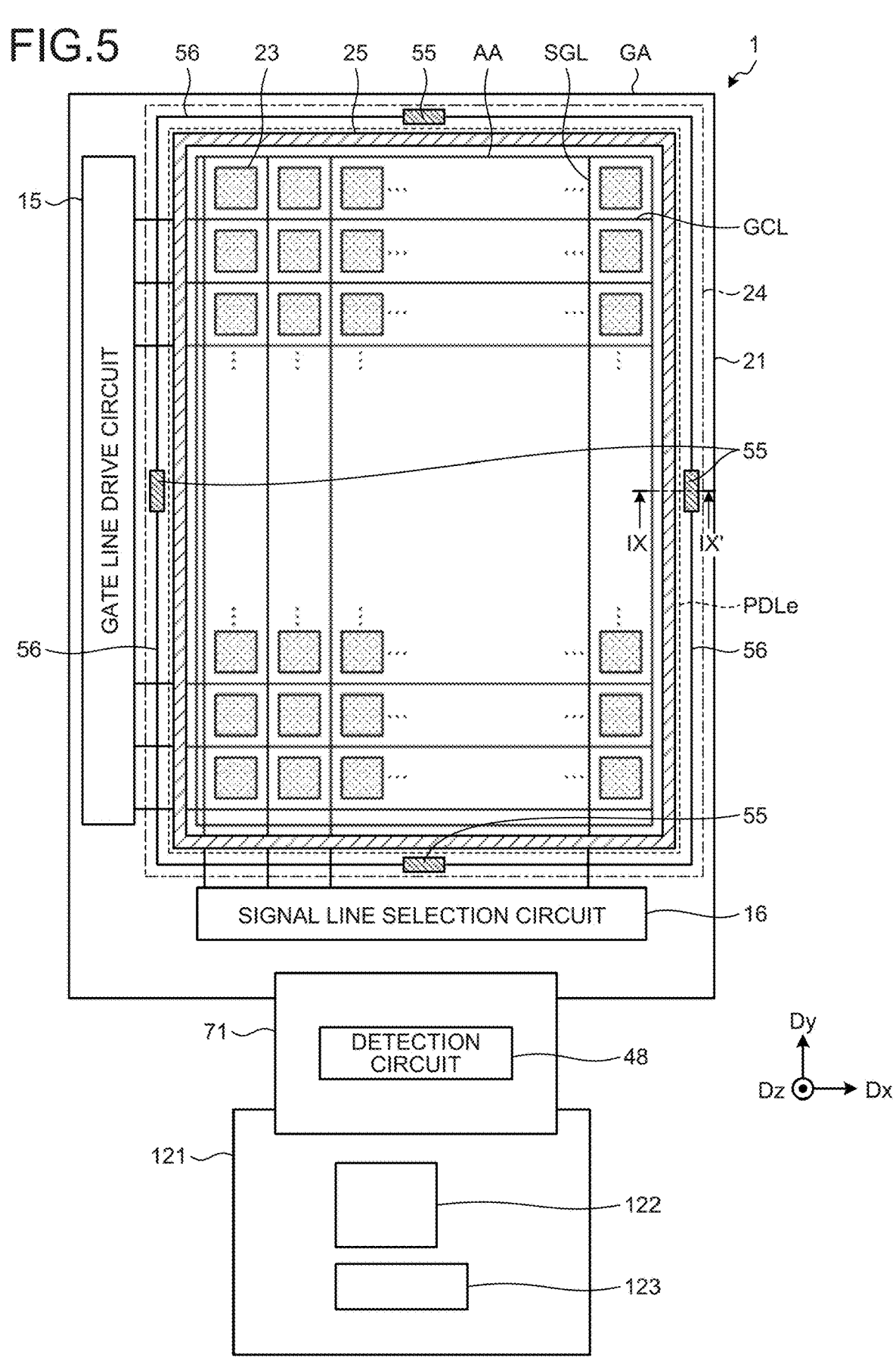
FIG. 5 is a plan view illustrating the detection device according to the first embodiment.
Figure 6:
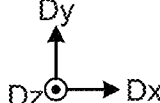
FIG. 6 is a plan view schematically illustrating the detection device according to the first embodiment.
Figure 7:
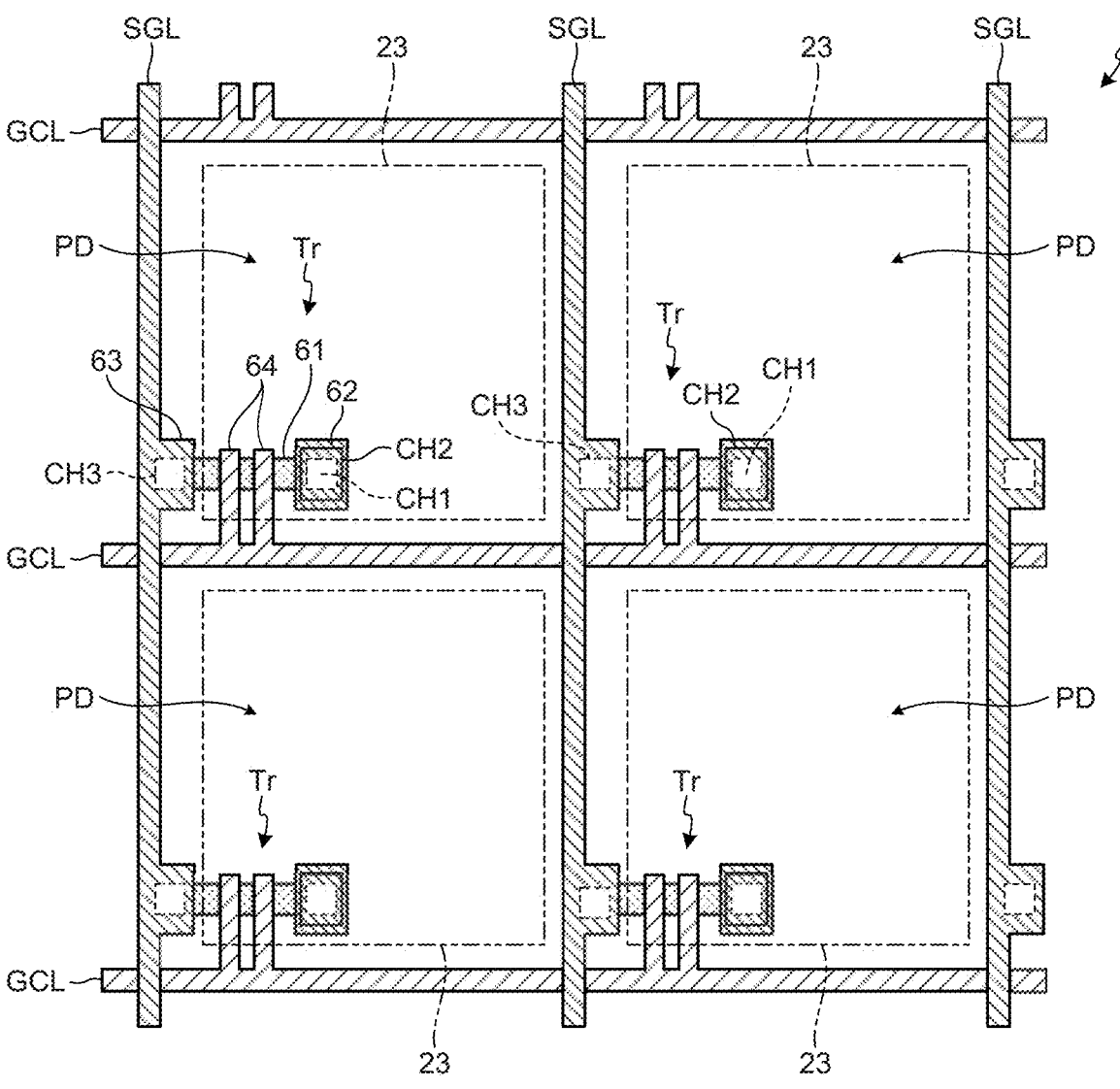
FIG. 7 is a plan view schematically illustrating first electrodes and transistors of the detection device according to the first embodiment.

The following describes a configuration of the photodiode PD. FIG. 5 is a plan view illustrating the detection device according to the first embodiment. FIG. 6 is a plan view schematically illustrating the detection device according to the first embodiment. FIG. 7 is a plan view schematically illustrating first electrodes and the transistors of the detection device according to the first embodiment. FIG. 6 illustrates an insulating film 95 with diagonal lines in order to facilitate viewing of the drawing. FIG. 7 is a plan view schematically illustrating a portion of the detection device without the insulating film illustrated in FIG. 6.

As illustrated in FIG. 5, the substrate 21 is electrically coupled to the control substrate 121 through the flexible printed circuit board 71. The flexible printed circuit board 71 is provided with the detection circuit 48. The control substrate 121 is provided with the control circuit 122 and the power supply circuit 123. The control circuit 122 is a field-programmable gate array (FPGA), for example. The control circuit 122 supplies the control signals to the sensor 10, the gate line drive circuit 15, and the signal line selection circuit 16 to control the detection operations of the sensor 10. The power supply circuit 123 supplies the voltage signals including, for example, the sensor power supply signal VDDSNS (refer to FIG. 4) to the sensor 10, the gate line drive circuit 15, and the signal line selection circuit 16.

The substrate 21 has the detection area AA and the peripheral area GA. The detection area AA is an area including an area overlapping a plurality of first electrodes 23 included in the sensor 10. The peripheral area GA is an area outside the detection area AA and does not overlap the first electrodes 23. That is, the peripheral area GA is an area between the outer perimeter of the detection area AA and the ends of the substrate 21. The gate line drive circuit 15 and the signal line selection circuit 16 are provided in the peripheral area GA.

The first electrodes 23 are detection electrodes of the photodiodes PD, and each output an electrical signal corresponding to light emitted thereto. The first electrodes 23 included in the sensor 10 are arranged in a matrix having a row-column configuration in the detection area AA. Each of the first electrodes 23 outputs the electrical signal corresponding to the light emitted thereto as the detection signal Vdet to the signal line selection circuit 16. The detection device 1 detects the information on the living body based on the detection signals Vdet from the first electrodes 23. In other words, the photodiode PD serves as a biometric sensor. Each of the first electrodes 23 performs the detection in response to the gate drive signal Vgcl supplied from the gate line drive circuit 15.

The gate line drive circuit 15 and the signal line selection circuit 16 are provided in the peripheral area GA. Specifically, the gate line drive circuit 15 is provided in the area extending along the second direction Dy in the peripheral area GA. The signal line selection circuit 16 is provided in the area extending along the first direction Dx in the peripheral area GA, and is provided between the sensor 10 and the detection circuit 48.

A second electrode 24 covers the detection area AA and has an area larger than the detection area AA. A conductive wiring line 56 is located in the peripheral area GA, and the conductive wiring line 56 is electrically coupled to the second electrode 24 through coupling terminals 55. The conductive wiring line 56 is coupled to the power supply circuit 123 illustrated in FIG. 1, and the sensor power supply signal VDDSNS is supplied to the conductive wiring line 56.

As illustrated in FIGS. 5, 6, and 7, the photodiode PD, the first electrode 23, and the first switching element Tr are provided in an area surrounded by the gate lines GCL and the signal lines SGL. The first electrode 23 is a lower electrode (cathode electrode) of the photodiode PD, and the photodiodes PD and the first electrodes 23 are arranged in a matrix having a row-column configuration on the upper side of the substrate 21.

As illustrated in FIG. 6, the insulating film 95 is provided between the adjacent first electrodes 23 and covers the outer perimeter of the first electrode 23. In more detail, the insulating film 95 includes a first portion 95a extending in the first direction Dx and a second portion 95b extending in the second direction Dy. The insulating film 95 is provided in a grid pattern with a plurality of the first portions 95a and a plurality of the second portions 95b intersecting each other.

The first portion 95a is provided so as to overlap the gate line GCL and is provided between the first electrodes 23 adjacent in the second direction Dy with the gate line GCL interposed therebetween. The second portion 95b is provided so as to overlap the signal line SGL and is provided between the first electrodes 23 adjacent in the first direction Dx with the signal line SGL interposed therebetween. In other words, the first electrodes 23 are partitioned by the insulating film 95. The first electrodes 23 are each coupled to a lower buffer layer 32 (refer to FIG. 8) of the photodiode PD at an opening OP formed in the insulating film 95. The lower buffer layer 32 is an electron transport layer.

As illustrated in FIG. 7, the first switching element Tr includes a semiconductor layer 61, a source electrode 62, a drain electrode 63, and a gate electrode 64. The semiconductor layer 61 extends along the gate line GCL and is provided so as to intersect the gate electrode 64 in plan view. The gate electrode 64 is coupled to the gate line GCL and extends in a direction orthogonal to the gate line GCL. One end side of the semiconductor layer 61 is coupled to the source electrode 62 through a second contact hole CH2. The first electrode 23 is electrically coupled to the source electrode 62 of the first switching element Tr through a first contact hole CH1. As a result, the first switching element Tr is electrically coupled to the photodiode PD. The other end side of the semiconductor layer 61 is coupled to the drain electrode 63 through a third contact hole CH3. The drain electrode 63 is coupled to the signal line SGL.

As illustrated in FIG. 6, a second organic insulating film 96 is provided so as to cover the first contact hole CH1. A detailed configuration of the second organic insulating film 96 and photodiode PD will be described with reference to FIG. 8. The configuration and the arrangement of the first switching elements Tr illustrated in FIGS. 6 and 7 are merely exemplary and can be changed as appropriate.

Figure 8:
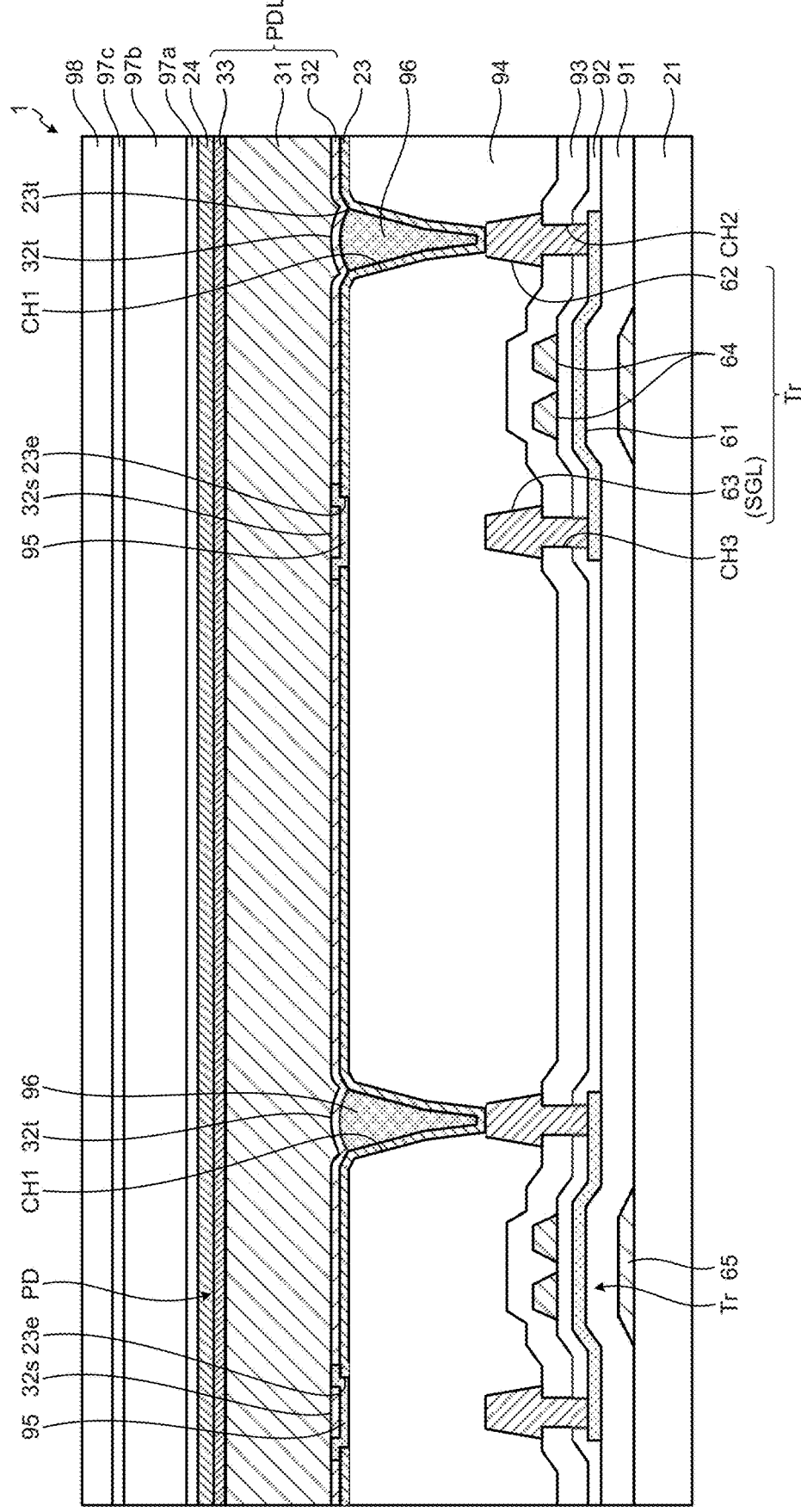
FIG. 8 is a sectional view along VIII-VIII' of FIG. 6.

FIG. 8 is a sectional view along VIII-VIII' of FIG. 6. As illustrated in FIG. 8, the detection device 1 includes the substrate 21, the first switching element Tr, a first organic insulating film 94, the first electrode 23, the insulating film 95, the second organic insulating film 96, an organic photodiode layer PDL, the second electrode 24, sealing films 97a, 97b, and 97c, and a resin mask 98.

The substrate 21 is an insulating base member and is made using, for example, glass or a resin material. The substrate 21 is not limited to having a flat plate shape and may have a curved surface. In this case, the substrate 21 may be made of a film-like resin.

In the present embodiment, a direction from the substrate 21 toward the organic photodiode layer PDL in a direction orthogonal to a surface of the substrate 21 is referred to as "upper side" or simply "above". A direction from the organic photodiode layer PDL toward the substrate 21 is referred to as "lower side" or simply "below".

A light-blocking film 65 is provided on the substrate 21. The light-blocking film 65 is provided between the semiconductor layer 61 and the substrate 21. The light-blocking film 65 can reduce light entering a channel area of the semiconductor layer 61 from the substrate 21 side.

An undercoat film 91 is provided on the substrate 21 so as to cover the light-blocking film 65. The undercoat film 91 is formed of, for example, an inorganic insulating film such as a silicon nitride film or a silicon oxide film. The undercoat film 91 is not limited to being configured as a single-layer film and may be configured as a multilayered film obtained by stacking a plurality of inorganic insulating films. An undercoat film may also be provided between the substrate 21 and the light-blocking film 65.

The first switching elements Tr (transistors) are provided above the substrate 21. The semiconductor layer 61 is provided on the undercoat film 91. For example, polysilicon is used as the semiconductor layer 61. The semiconductor layer 61 is, however, not limited thereto, and may be formed of, for example, a microcrystalline oxide semiconductor, an amorphous oxide semiconductor, or low-temperature polysilicon. Although only an n-type TFT is illustrated as the first switching element Tr, a p-type TFT may be formed in addition to the n-type TFT.

A gate insulating film 92 is provided on the undercoat film 91 so as to cover the semiconductor layer 61. The gate insulating film 92 is, for example, an inorganic insulating film such as a silicon oxide film. The gate electrode 64 is provided on the upper side of the gate insulating film 92. In the example illustrated in FIG. 7, the first switching element Tr has a top-gate structure.

However, the first switching element Tr is not limited thereto and may have a bottom-gate structure, or a dual-gate structure in which the gate electrodes 64 are provided on both the upper side and lower side of the semiconductor layer 61.

An interlayer insulating film 93 is provided on the gate insulating film 92 so as to cover the gate electrode 64. The interlayer insulating film 93 has, for example, a multilayered structure of a silicon nitride film and a silicon oxide film. The source electrode 62 and the drain electrode 63 are provided on the interlayer insulating film 93. The source electrode 62 is coupled to a source region of the semiconductor layer 61 through the second contact hole CH2 provided in the gate insulating film 92 and the interlayer insulating film 93. The drain electrode 63 is coupled to a drain region of the semiconductor layer 61 through the third contact hole CH3 provided in the gate insulating film 92 and the interlayer insulating film 93.

The first organic insulating film 94 is provided on the interlayer insulating film 93 so as to cover the source electrode 62 and the drain electrode 63 of the first switching element Tr. The first organic insulating film 94 is an organic planarizing film and has a better coverage property for wiring steps and provides better surface flatness than inorganic insulating materials formed by, for example, chemical vapor deposition (CVD).

The organic photodiode layer PDL is provided above the first organic insulating film 94. The first electrode 23 and the insulating film 95 are provided between both the substrate 21 and the first organic insulating film 94 and the organic photodiode layer PDL in the direction orthogonal to the surface of the substrate 21.

In more detail, the first electrode 23 is provided on the first organic insulating film 94 and is provided so as to cover the bottom surface and the inner side surface of the first contact hole CH1 formed in the first organic insulating film 94. The first electrode 23 is coupled to the source electrode 62 of the first switching element Tr at the bottom surface of the first contact hole CH1. The first electrode 23 is a cathode electrode of the organic photodiode layer PDL and is formed of a light-transmitting conductive material such as indium tin oxide (ITO) or indium zinc oxide (IZO). The first electrodes 23 are arranged so as to be separated from each other on a detection element PAA (photodiode PD) basis. The organic photodiode layer PDL has a larger area than the first electrode 23 in plan view and covers the upper surface and outer edges 23e of the first electrode 23.

The insulating film 95 is provided between the adjacent first electrodes 23 and is provided so as to cover the outer edges 23e of the first electrodes 23. In the present embodiment, the insulating film 95 is an inorganic insulating film and is made using a material such as a silicon nitride film or an aluminum oxide film. The insulating film 95 has at least one or more of the openings OP (refer to FIG. 6) in an area overlapping the upper surface of the first electrode 23. The organic photodiode layer PDL is electrically coupled to the first electrode 23 through the opening OP.

The insulating film 95 is provided between the first organic insulating film 94 and the organic photodiode layer PDL in an area between the adjacent first electrodes 23. The insulating film 95 thereby insulates the adjacent first electrodes 23 from each other. In other words, the insulating film 95 can reduce leak currents between the adjacent photodiodes PD. The insulating film 95 also serves as a barrier film that reduces water entering the organic photodiode layer PDL from the first organic insulating film 94 in the area between the adjacent first electrodes 23.

The second organic insulating film 96 is provided so as to cover the inside of the first contact hole CH1. The first electrode 23 and the second organic insulating film 96 are stacked on the inner side surface and the bottom surface of the first contact hole CH1. The first organic insulating film 94, the first electrode 23, and the second organic insulating film 96 are stacked in this order on the inner side surface of the first contact hole CH1. The first electrode 23 and the second organic insulating film 96 are stacked in this order on the bottom surface of the first contact hole CH1 above the source electrode 62. The second organic insulating film 96 is provided so as to cover a corner 23t of the first electrode 23 in a position overlapping the open end of the first contact hole CH1.

The organic photodiode layer PDL is provided so as to cover the first electrodes 23, the insulating film 95, and the second organic insulating film 96. In more detail, the organic photodiode layer PDL includes an active layer 31, the lower buffer layer 32 (first carrier transport layer), and an upper buffer layer 33 (second carrier transport layer). The lower buffer layer 32 (first carrier transport layer) is provided between the active layer 31 and the first electrode 23. The upper buffer layer 33 (second carrier transport layer) is provided between the active layer 31 and the second electrode 24. The upper buffer layer 33 is a hole transport layer.

The lower buffer layer 32 is formed by coating using a material such as zinc acetate, ethoxylated polyethylenimine (PEIE), or polyethylenimine (PEI). The lower buffer layer 32 is a single layer, and has a thickness of, for example, approximately 30 nm or smaller.

A mixture of a p-type organic semiconductor and an n-type organic semiconductor is used as the active layer 31. Examples of the p-type organic semiconductor include PMDPP3T(poly((2,5-bis(2-hexyldecyl)-2,3,5,6-tetrahydro-3,6-dioxopyrrolo(3,4-c)pyrrole-1,4-diyl)-alt-(3',3"-dim-ethyl-2,2':5',2"-terthiophene)-5,5"-diyl)). Examples of the n-type organic semiconductor include $PC_{61}BM$ ((6,6)-phe-nyl $C_{61}$-butyric acid methyl ester). The thickness of the active layer 31 is, for example, approximately from 100 nm to 500 nm, and preferably approximately 350 nm.

The upper buffer layer 33 is, for example, a metal oxide layer of, for example, tungsten oxide ($WO_3$) or a molybdenum oxide (MoOx). The upper buffer layer 33 is formed of a vapor-deposited film or a sputtered film, and has a thickness of, for example, approximately 30 nm or smaller.

The lower buffer layer 32, the active layer 31, and the upper buffer layer 33 forming the organic photodiode layer PDL are provided so as to cover the first electrodes 23, the insulating film 95, and the second organic insulating film 96. The lower buffer layer 32 is coupled to the first electrodes 23 in areas overlapping the openings OP of the insulating film 95. The lower buffer layer 32 includes an overlapping portion 32s provided on the insulating film 95 and an overlapping portion 32t provided on the second organic insulating film 96 in an area overlapping the first contact hole CH1.

In the detection device 1, the first organic insulating film 94, the first electrode 23, the lower buffer layer 32, the active layer 31, the upper buffer layer 33, and the second electrode 24 are stacked in this order in the direction orthogonal to the substrate 21 in an area overlapping the first electrode 23. In the area overlapping the first contact hole CH1, the first electrode 23, the second organic insulating film 96, the lower buffer layer 32 (overlapping portion 32t), the active layer 31, the upper buffer layer 33, and the second electrode 24 are stacked in this order. In the area between the adjacent first electrodes 23, the first organic insulating film 94, the insulating film 95, the lower buffer layer 32 (overlapping portion 32s), the active layer 31, the upper buffer layer 33, and the second electrode 24 are stacked in this order.

As described above, the insulating film 95 is provided between the adjacent first electrodes 23 and covers the outer edges 23e of the first electrodes 23. With this configuration, the lower buffer layer 32 is formed thinner in positions overlapping the outer edges 23e of the first electrodes 23. The insulating film 95 can reduce occurrences of short circuits between the active layer 31 and the first electrode 23 even if a step disconnection occurs between the overlapping portion 32s and the lower buffer layer 32 on the first electrode 23. To facilitate understanding, FIG. 8 illustrates a case where the overlapping portion 32s and the lower buffer layer 32 on the first electrode 23 are formed separately from each other. However, the overlapping portion 32s and the lower buffer layer 32 on the first electrode 23 may be continuously formed in one piece.

Furthermore, the second organic insulating film 96 is provided so as to cover the inside of the first contact hole CH1 and covers the corner 23t of the first electrode 23 formed at the edge of the opening of the first contact hole CH1. This configuration planarizes the area overlapping the first contact hole CH1 and forms the overlapping portion 32t of the lower buffer layer 32 continuously with the lower buffer layer 32 on the first electrode 23. The second organic insulating film 96 covers most of the area of the first electrode 23 inside the first contact hole CH1. As a result, the second organic insulating film 96 can reduce the occurrences of the short circuits between the active layer 31 and the first electrode 23 even if a portion of the lower buffer layer 32 is formed thinner or the lower buffer layer 32 has a step disconnection in the area overlapping the first contact hole CH1.

Since the second organic insulating film 96 planarizes the area overlapping the first contact hole CH1, variations in thicknesses of the active layer 31, the lower buffer layer 32, and the upper buffer layer 33 that form the organic photodiode layer PDL are reduced over the area overlapping the first contact hole CH1 and areas not overlapping the first contact hole CH1. That is, compared with a configuration in which the second organic insulating film 96 is not provided, the step disconnection and the thinning of the active layer 31, the lower buffer layer 32, and the upper buffer layer 33 are reduced in the area overlapping the first contact hole CH1. As a result, the detection device 1 can reduce a leak current between the anode and cathode of the photodiode PD.

The second electrode 24 is an upper electrode provided on the upper side of the organic photodiode layer PDL. More specifically, the second electrode 24 is provided on the upper side of the upper buffer layer 33 of the organic photodiode layer PDL. The second electrode 24 is an anode electrode of the photodiode PD and is continuously formed over the detection elements PAA (photodiodes PD). The second electrode 24 is made using a metal material such as silver (Ag) and serves as a reflective electrode. The second electrode 24 is not limited to this material and may be formed of a light-transmitting conductive material in the same manner as the first electrode 23.

The sealing films 97a, 97b, and 97c are provided on the upper side of the second electrode 24. An inorganic film such as a silicon nitride film or an aluminum oxide film is used as each of the sealing films 97a and 97c. A resin film of, for example, an acrylic material is used as the sealing film 97b. The sealing films 97a, 97b, and 97c are not limited to the multilayered films in which inorganic and organic insulating films are stacked, and may be a single-layered film. The resin mask 98 is further provided so as to cover the sealing film 97c. The sealing films 97a, 97b, and 97c and the resin mask 98 well seal the organic photodiode layer PDL, and thus can reduce water entering the organic photodiode layer PDL from the upper surface side thereof.

The thickness of the first electrode 23 is approximately 50 nm, for example. The thickness of the second electrode 24 is approximately 100 nm or smaller, for example. That is, the thickness of each of the lower buffer layer 32 and the upper buffer layer 33 is smaller than the active layer 31 and smaller than each of the first and the second electrodes 23 and 24. In other words, the thickness of each of the first and the second electrodes 23 and 24 is smaller than the active layer 31 and larger than each of the lower buffer layer 32 and the upper buffer layer 33.

The materials and the manufacturing methods of the lower buffer layer 32, the active layer 31, and the upper buffer layer 33 are merely exemplary, and other materials and manufacturing methods may be used. For example, the lower buffer layer 32 may be a vapor-deposited film or a sputtered film using a material such as zinc oxide (ZnO) or a titanium oxide ($TiO_2$). The upper buffer layer 33 may be a vapor-deposited film or a sputtered film using a material such as nickel oxide (NiO), or the upper buffer layer 33 may be formed by coating using nanoparticle ink of, for example, a vanadium oxide ($V_2O_5$) or tungsten oxide ($WO_3$), or using a material such as PEDOT:PSS.

The planar and sectional shapes of the insulating film 95 and the second organic insulating film 96 illustrated in FIGS. 6 and 8 are merely schematically illustrated and can be changed as appropriate. For example, the upper surface of the second organic insulating film 96 is not limited to a configuration having a curved surface and may be partially formed flat. The planar shape of the second organic insulating film 96 is not limited to a quadrilateral shape and may be another shape such as a circular shape or a polygonal shape depending on the planar shape of the first contact hole CH1. The shape of the opening OP formed in the insulating film 95 is not limited to a quadrilateral shape and can be changed as appropriate depending on the shape of the first electrode 23.

Figure 9:
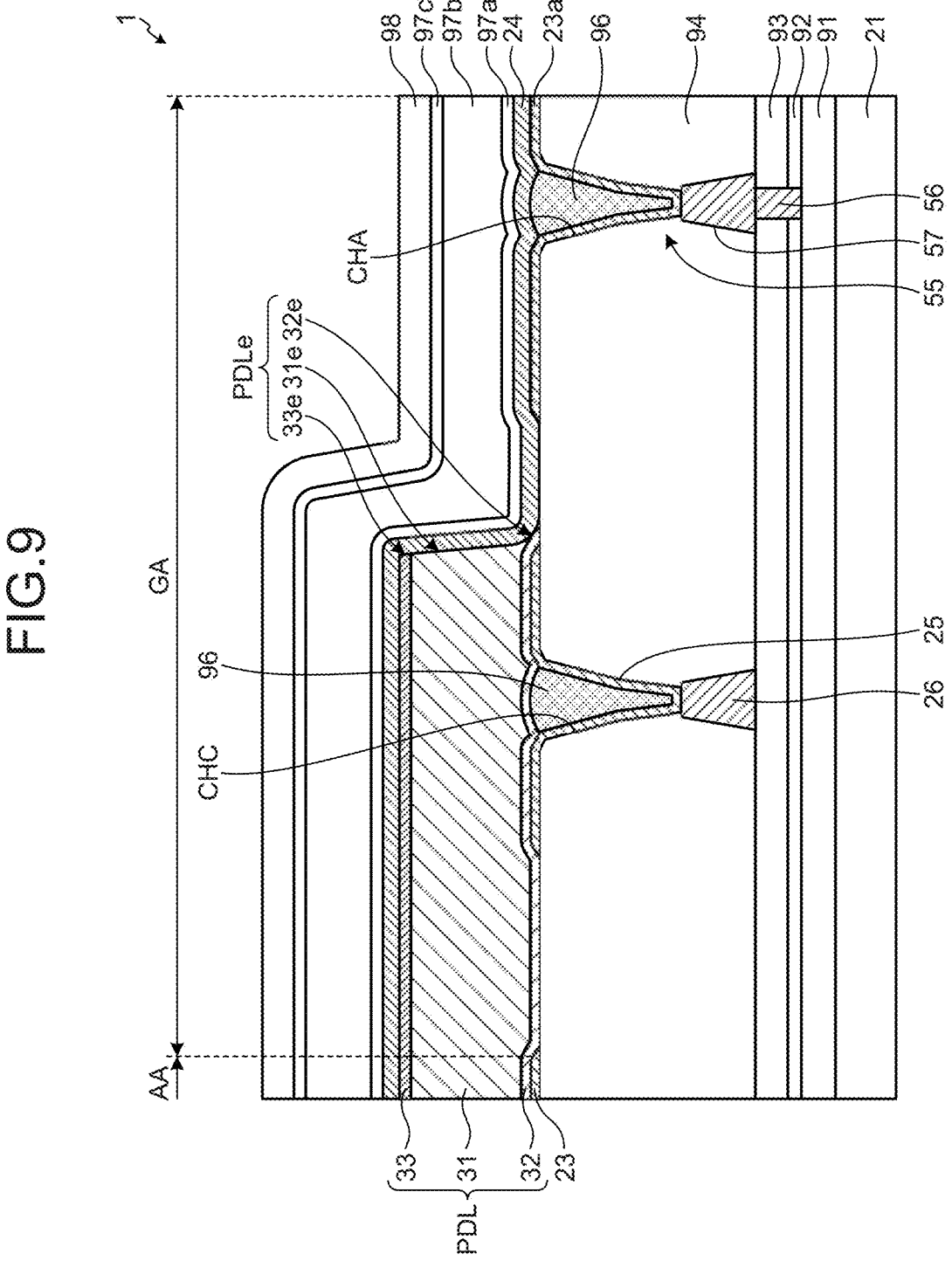
FIG. 9 is a sectional view along IX-IX' of FIG. 5.

FIG. 9 is a sectional view along IX-IX' of FIG. 5. In the peripheral area GA around the detection area AA, the second electrode 24 is coupled to the conductive wiring line 56. The peripheral area GA has a non-forming area of the organic photodiode layer PDL, and side surfaces 33e of the upper buffer layer 33, side surfaces 31e of the active layer 31, and side surfaces 32e of the lower buffer layer 32 are exposed at ends of the non-forming area. The side surfaces 33e of the upper buffer layer 33, the side surfaces 31e of the active layer 31, and the side surfaces 32e of the lower buffer layer 32 are side surfaces PDLe of the organic photodiode layer PDL. The second electrode 24 provided so as to cover the side surfaces PDLe of the organic photodiode layer PDL is electrically coupled to the side surfaces 33e of the upper buffer layer 33, the side surfaces 31e of the active layer 31, and the side surfaces 32e of the lower buffer layer 32. Therefore, the second electrode 24 is stacked on the exposed side surfaces PDLe of the organic photodiode layer PDL in the peripheral area GA, and leak currents can flow between the second electrode 24 and the first electrodes 23 at the outermost periphery. In the first embodiment, a third electrode 25 is formed between the second electrode 24 on the side surfaces PDLe of the organic photodiode layer PDL and the first electrode 23 at the outermost periphery in order to reduce the leak currents to the first electrodes 23.

The conductive wiring line 56 is routed and the coupling terminals 55 are formed in the peripheral area GA. The conductive wiring line 56 is formed on the undercoat film 91. Each of the coupling terminals 55 includes a conductive base 57 electrically coupled to the conductive wiring line 56 and a terminal electrode 23a electrically coupled to the base 57 through a contact hole CHA. The second organic insulating film 96 is provided so as to cover the inside of the contact hole CHA. The terminal electrode 23a is electrically coupled to second electrode 24.

The third electrode 25 is electrically coupled to a reference potential wiring line 26 through a contact hole CHC. The reference potential wiring line 26 is routed along the outermost periphery of the first electrodes 23.

The reference potential wiring line 26 is supplied with the same potential as the reference signal COM. Therefore, the third electrode 25 has the same potential as the reference signal that is a reset potential supplied from the reset circuit 17 to the signal line SGL. As a result, the potential difference between the third electrode 25 and the first electrode 23 decreases, and thus, the leak current from the third electrode 25 to the first electrode 23 becomes difficult to occur.

If a leak current from the second electrode 24 to the third electrode 25 is a problem during periods such as when optical detection is not performed, the reference potential wiring line 26 may be supplied with the same potential as that of the second electrode 24. As a result, the potential difference between the third electrode 25 and the second electrode 24 decreases, and thus, the leak current from the second electrode 24 to the third electrode 25 becomes difficult to occur.

The second organic insulating film 96 is provided so as to cover the inside of the contact hole CHC. As illustrated in FIG. 5, the third electrode 25 is routed along the outermost periphery of the first electrodes 23 and surrounds the first electrodes 23 in a quadrilateral shape. Thus, the third electrode 25 surrounds the entire outermost periphery of the first electrodes 23. The second electrode 24 is electrically coupled to the conductive wiring line 56 routed in the peripheral area GA outside the third electrode 25.

As described above, the detection device 1 of the first embodiment includes the photodiodes PD, the first electrodes 23, the second electrode 24, the third electrode 25, and the organic photodiode layer PDL that are provided on the substrate 21. The first electrodes 23 are provided correspondingly to the photodiodes PD. The second electrode 24 is provided across the photodiodes PD. The organic photodiode layer PDL includes the lower buffer layer 32 (first carrier transport layer), the active layer 31, and the upper buffer layer 33 (second carrier transport layer), and is provided across the photodiodes PD.

In the detection area AA where the first electrodes 23 are arranged, each of the photodiodes PD includes the first electrode 23, the lower buffer layer 32 (first carrier transport layer), the active layer 31, the upper buffer layer 33 (second carrier transport layer), and the second electrode 24 that are stacked in the order as listed. The third electrode 25 is supplied with the reference potential. The third electrode 25 is located between the second electrode 24 and the first electrodes 23. The second electrode 24 is provided so as to cover the side surfaces PDLe of the organic photodiode layer PDL outside the detection area AA, and the first electrodes 23 are arranged at the outermost periphery.

With this configuration, the leak current flows between the second electrode 24 and the third electrode 25, and the leak currents between the second electrode 24 on the side surfaces PDLe of the organic photodiode layer PDL and the first electrodes 23 at the outermost periphery are reduced.

Second Embodiment

Figure 10:
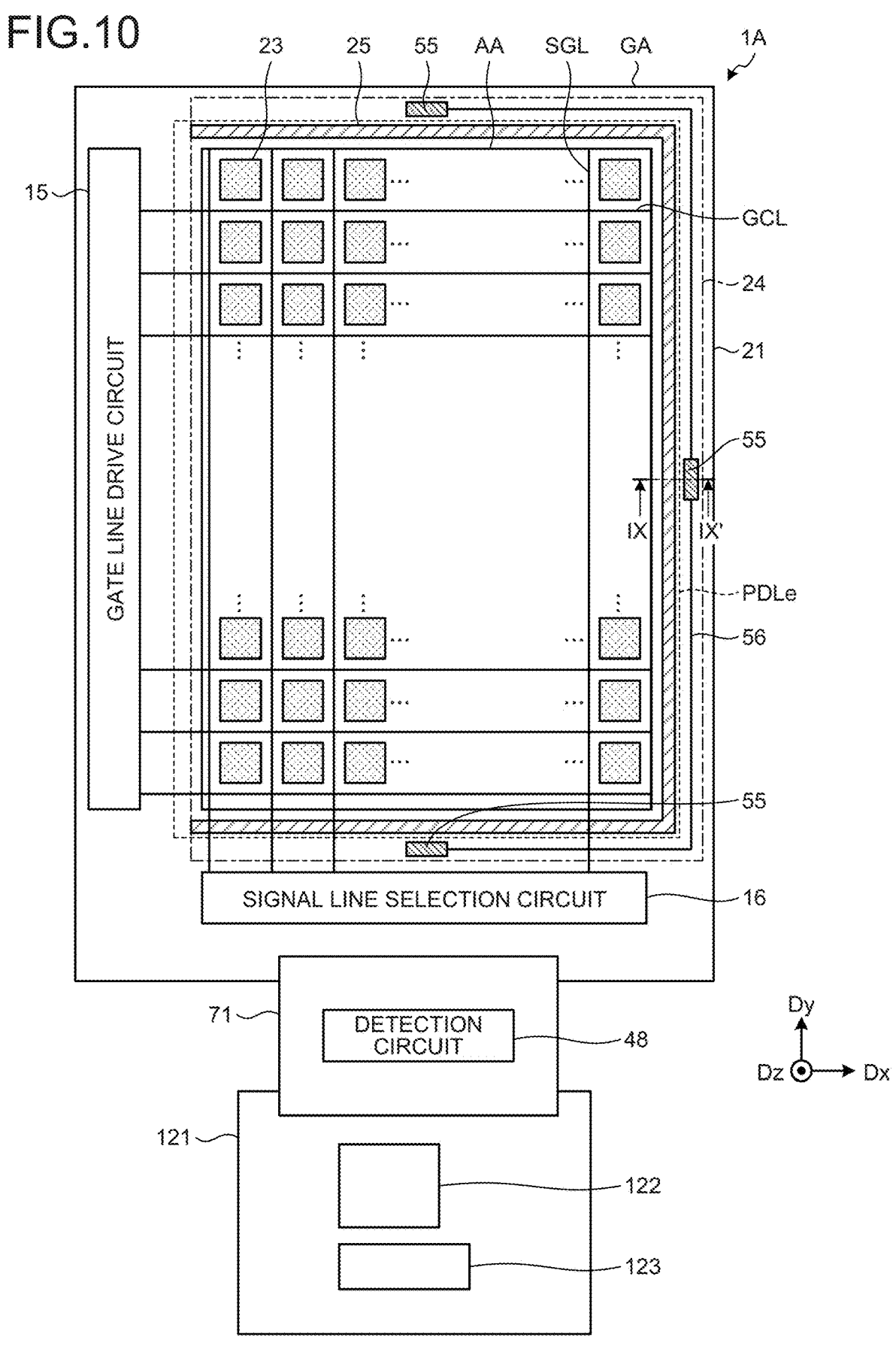
FIG. 10 is a plan view illustrating a detection device according to a second embodiment of the present disclosure.

FIG. 10 is a plan view illustrating a detection device according to a second embodiment of the present disclosure. In the following description, the same components as those described in the embodiment above are denoted by the same reference numerals, and the description thereof will not be repeated.

As illustrated in FIG. 10, in the peripheral area GA of a detection device 1A according to the second embodiment, the conductive wiring line 56 is disposed in a U-shape, and the conductive wiring line 56 is electrically coupled to the second electrode 24 via the coupling terminals 55. The conductive wiring line 56 is coupled to the power supply circuit 123 illustrated in FIG. 1, and the sensor power supply signal VDDSNS is supplied to the conductive wiring line 56. The third electrode 25 is routed along the outermost periphery of the first electrodes 23 and surrounds the first electrodes 23 in a U-shaped manner.

With this configuration, the leak current flows between the second electrode 24 and the third electrode 25, and the leak currents between the second electrode 24 on the side surfaces PDLe of the organic photodiode layer PDL and the first electrodes 23 at the outermost periphery are reduced.

As described above, in the detection device 1A of the second embodiment, the third electrode 25 is disposed on all but one of the sides surrounding the outermost periphery of the first electrodes 23. In an area where the third electrode 25 is not disposed, the second electrode 24 is located inside the side surfaces PDLe of the organic photodiode layer PDL. That is, in the area where the third electrode 25 is not disposed, the second electrode 24 is not stacked on the side surface PDLe of the organic photodiode layer PDL. This configuration reduces leak currents in the area where the third electrode 25 is not disposed.

Third Embodiment

Figure 11:
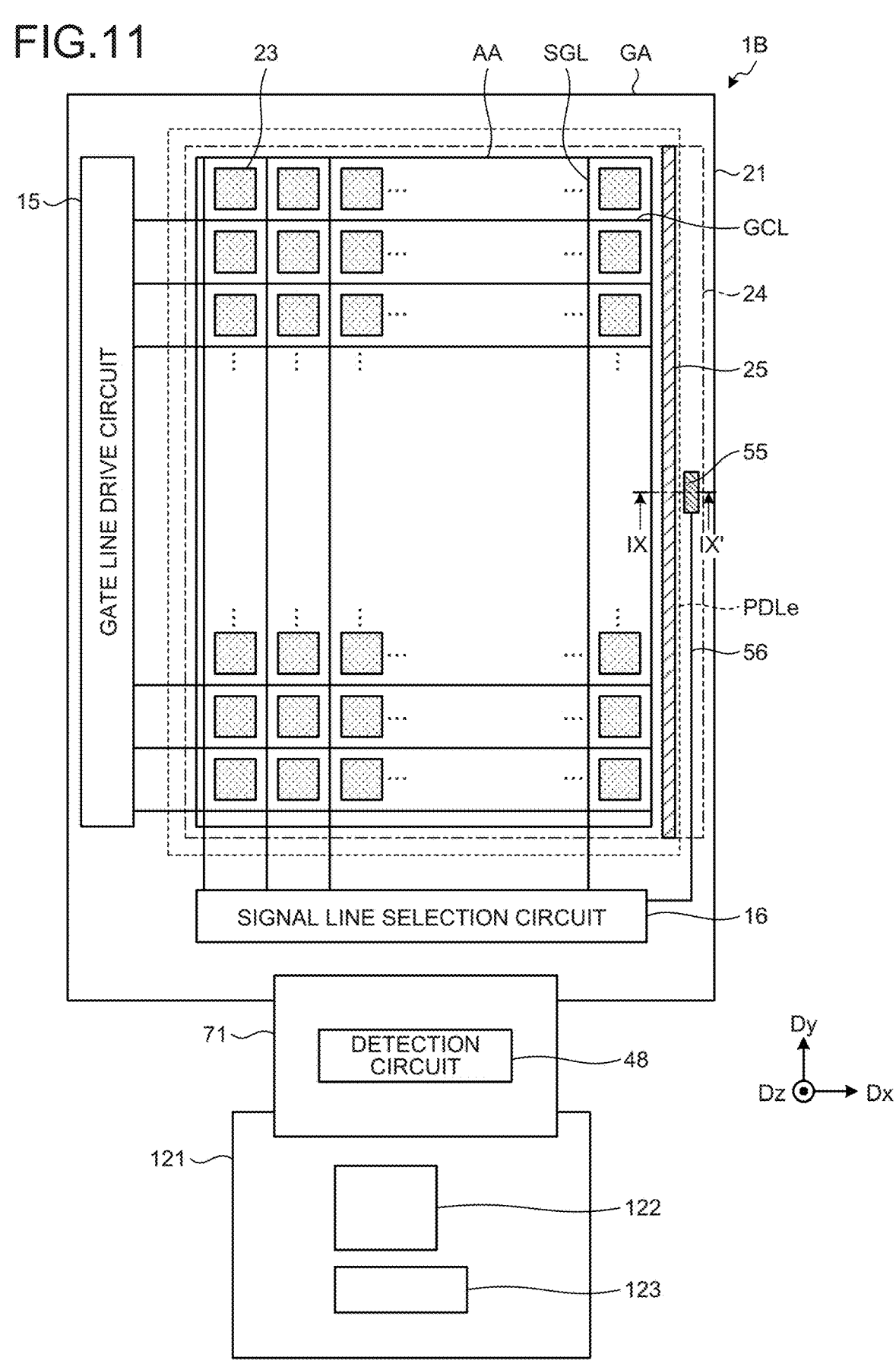
FIG. 11 is a plan view illustrating a detection device according to a third embodiment of the present disclosure.

FIG. 11 is a plan view illustrating a detection device according to a third embodiment of the present disclosure. In the following description, the same components as those described in either of the embodiments above are denoted by the same reference numerals, and the description thereof will not be repeated.

As illustrated in FIG. 11, in a portion of the peripheral area GA of a detection device 1B according to the third embodiment, the conductive wiring line 56 is disposed in a straight line shape, and the conductive wiring line 56 is electrically coupled to the second electrode 24 via the coupling terminal 55. The conductive wiring line 56 is coupled to the power supply circuit 123 illustrated in FIG. 1, and the sensor power supply signal VDDSNS is supplied to the conductive wiring line 56. The third electrode 25 is routed along the outermost periphery of the first electrodes 23 and is disposed in a straight line shape.

With this configuration, the leak current flows between the second electrode 24 and the third electrode 25, and the leak currents between the second electrode 24 on the side surfaces PDLe of the organic photodiode layer PDL and the first electrodes 23 at the outermost periphery are reduced.

As described above, in the detection device 1B of the third embodiment, the third electrode 25 is located on only one of the sides surrounding the outermost periphery of the first electrodes 23. In an area of a plurality of sides where the third electrode 25 is not disposed, the second electrode 24 is located inside the side surfaces PDLe of the organic photo-diode layer PDL. That is, in the area where the third electrode 25 is not disposed, the second electrode 24 is not stacked on the side surfaces PDLe of the organic photodiode layer PDL. This configuration reduces leak currents in the area on the sides where the third electrode 25 is not disposed.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and modifications described above.

What is claimed is:

1. A detection device comprising:
a substrate; and
a plurality of photodiodes provided in a detection area of the substrate, wherein
the photodiodes comprise:
a plurality of first electrodes provided correspondingly to the photodiodes;
a second electrode provided across the photodiodes; and an organic photodiode layer that comprises a first carrier transport layer, an active layer, and a second carrier transport layer, and is provided across the photodiodes, wherein
in the detection area, the first electrodes, the first carrier transport layer, the active layer, the second carrier transport layer, and the second electrode are stacked in the order as listed, and
outside the detection area, a third electrode configured to be supplied with a reference potential is disposed between the second electrode provided so as to cover a side surface of the organic photodiode layer and the first electrodes arranged at an outermost periphery.

2. The detection device according to claim 1, wherein the third electrode surrounds an entire outermost periphery of the first electrodes.

3. The detection device according to claim 2, wherein the second electrode is electrically coupled to a wiring line routed in a peripheral area outside the third electrode.

4. The detection device according to claim 1, wherein the third electrode is disposed on all but one of sides surrounding an outermost periphery of the first electrodes.

5. The detection device according to claim 4, wherein
in an area where the third electrode is not disposed, the second electrode is located inside a side surface of the organic photodiode layer.

6. The detection device according to claim 1, wherein the third electrode is disposed on only one of sides surrounding an outermost periphery of the first electrodes.

7. The detection device according to claim 6, wherein, in an area of a plurality of sides where the third electrode is not disposed among the sides surrounding the outermost periphery of the first electrodes, the second electrode is located inside the side surfaces of the organic photodiode layer.

8. The detection device according to claim 1, wherein the second electrode provided so as to cover the side surface of the organic photodiode layer is electrically coupled to the first carrier transport layer, the active layer, and the second carrier transport layer on the side surface of the organic photodiode layer.

9. The detection device according to claim 1, further comprising:
a plurality of signal lines; and
a first switching element that is provided for each of the photodiodes and is configured to select the photodiode and output a detection signal to a corresponding signal line of the signal lines, wherein
the reference potential supplied to the third electrode is the same as a reset potential to make a potential of the signal lines constant.

10. The detection device according to claim 1, wherein the reference potential supplied to the third electrode is the same as a potential of the second electrode.

*     *     *     *     *